US009672366B1

(12) United States Patent
Khetawat et al.

(10) Patent No.: US 9,672,366 B1
(45) Date of Patent: Jun. 6, 2017

(54) TECHNIQUES FOR CLIPBOARD MONITORING

(71) Applicant: Symantec Corporation, Mountain View, CA (US)

(72) Inventors: Rupesh Hanumant Khetawat, Pune (IN); Sumesh Jaiswal, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/674,642

(22) Filed: Mar. 31, 2015

(51) Int. Cl.
*G06F 21/00* (2013.01)
*G06F 21/60* (2013.01)
*G06F 9/54* (2006.01)

(52) U.S. Cl.
CPC ............ *G06F 21/606* (2013.01); *G06F 9/543* (2013.01)

(58) Field of Classification Search
CPC combination set(s) only.
See application file for complete search history.

(56) References Cited

U.S. PATENT DOCUMENTS

2008/0256601 A1* 10/2008 Dutta .................... G06F 21/554
726/3
2012/0166737 A1* 6/2012 Furuichi ............. G06F 21/6209
711/147

* cited by examiner

*Primary Examiner* — Ghazal Shehni
(74) *Attorney, Agent, or Firm* — Wilmer Cutler Pickering Hale and Dorr LLP

(57) ABSTRACT

Techniques for clipboard monitoring are disclosed. In one embodiment, the techniques may be realized as a method including identifying text that has been copied from an application to a clipboard; copying the identified text to a cache separate from the clipboard; replacing the identified text in the clipboard with a delayed clipboard object; in response to a reference call from the delayed clipboard object, analyzing the copied text for sensitive data; and in response to determining that the copied text includes sensitive data, providing a response to the reference call from the delayed clipboard object that does not include the copied text.

18 Claims, 6 Drawing Sheets

TECHNIQUES FOR CLIPBOARD MONITORING

FIELD OF THE DISCLOSURE

The present disclosure relates generally to data loss and, more particularly, to techniques for clipboard monitoring.

BACKGROUND OF THE DISCLOSURE

Modern general-purpose computing systems present a variety of challenges for data loss prevention (DLP). It can be difficult to limit the exposure of certain types of data when hundreds of different applications may be available for use on a particular system, each one a potential vector for data loss.

A conventional method to prevent the loss of sensitive data is to monitor the specific applications that have direct access to the sensitive data and to limit or intercept questionable functions used within these programs. However, modern computing systems also include system functions such as the clipboard object which allow for the quick movement of data from one application to another. Controls placed on a particular application might therefore be bypassed by a user who copies and pastes the sensitive data to another application without the same controls.

In view of the foregoing, it may be understood that there may be significant problems and shortcomings associated with traditional DLP methods.

SUMMARY OF THE DISCLOSURE

Techniques for clipboard monitoring are disclosed. In one embodiment, the techniques may be realized as a method including identifying text that has been copied from an application to a clipboard; copying the identified text to a cache separate from the clipboard; replacing the identified text in the clipboard with a delayed clipboard object; in response to a reference call from the delayed clipboard object, analyzing the copied text for sensitive data; and in response to determining that the copied text includes sensitive data, providing a response to the reference call from the delayed clipboard object that does not include the copied text.

In accordance with other aspects of this embodiment, the method may further include identifying second text that has been copied from an application to the clipboard; copying the identified second text to the cache separate from the clipboard; replacing the second identified text in the clipboard with a second delayed clipboard object; in response to a reference call from the second delayed clipboard object, analyzing the second copied text for sensitive data; identifying both the origin application from which the second text was copied and a destination application associated with the reference call; and in response to determining that the origin application matches the destination application, providing a response to the reference call from the delayed clipboard object that includes the copied text.

In accordance with other aspects of this embodiment, the method may further include monitoring the foreground application associated with the clipboard; in response to determining that the foreground application has switched from a first application to a second application, determining if there is text in the clipboard; in response to determining that there is text in the clipboard, replacing the text with a delayed clipboard object.

In accordance with other aspects of this embodiment, the method may further include providing alternative text to the clipboard such that the alternative text will be provided to a destination application upon resolution of a paste command associated with the reference call. In accordance with other aspects of this embodiment, the method may further include displaying an alert notifying a user that a paste command has been blocked.

In accordance with other aspects of this embodiment, the method may further include collecting data including at least the copied text, the origin application from which the text was copied to the clipboard, and a destination application associated with the reference call; and recording the collected data in an event log.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

A loss prevention agent monitors a system clipboard and replaces copied text with a delayed clipboard object referring to the agent. When a "paste" command prompts the system to request text from the agent, the clipboard text is first analyzed to identify sensitive data. Sensitive data is only permitted to be moved within a particular application but is eliminated and replaced rather than being allowed to be copied to a different application.

Figure 1:
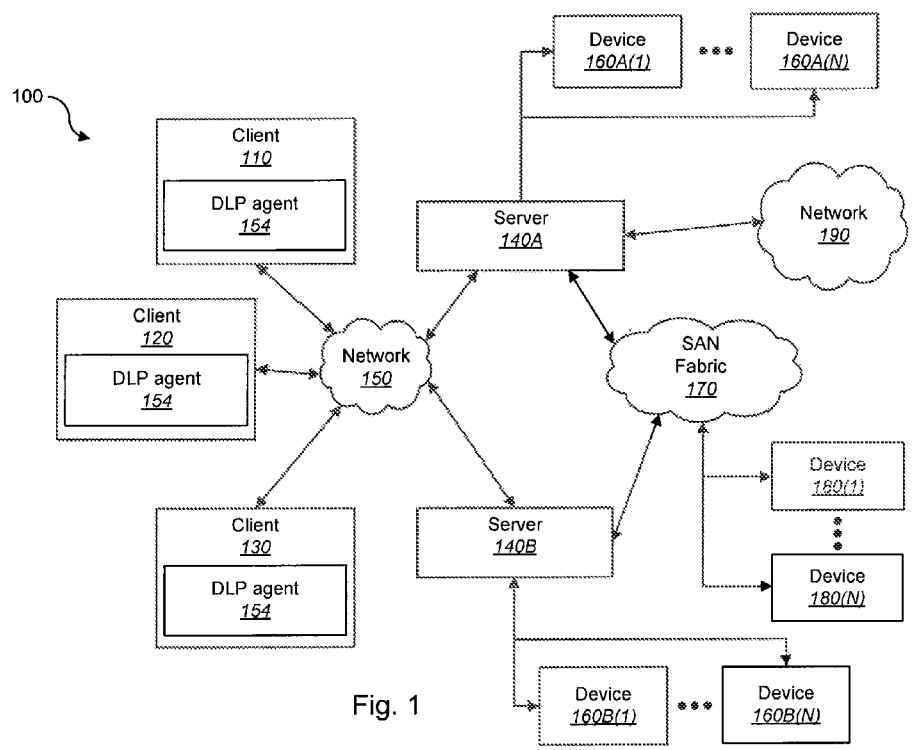
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
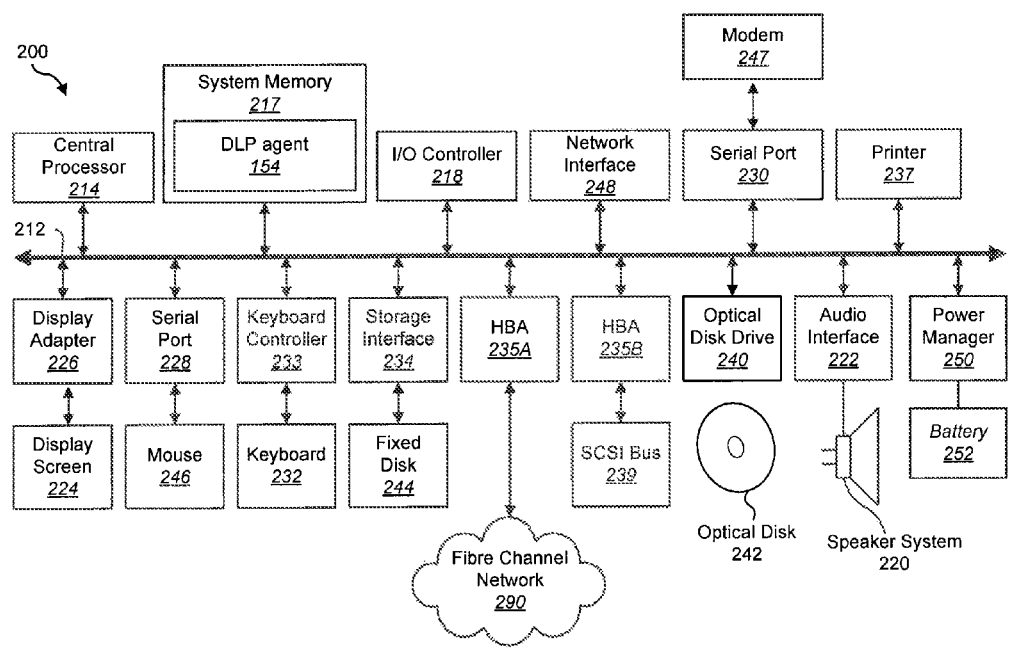
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of data loss prevention such as, for example, data loss prevention (DLP) agent 154. Further, one or more portions of the DLP agent 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including DLP agent 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, DLP agent 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3A:
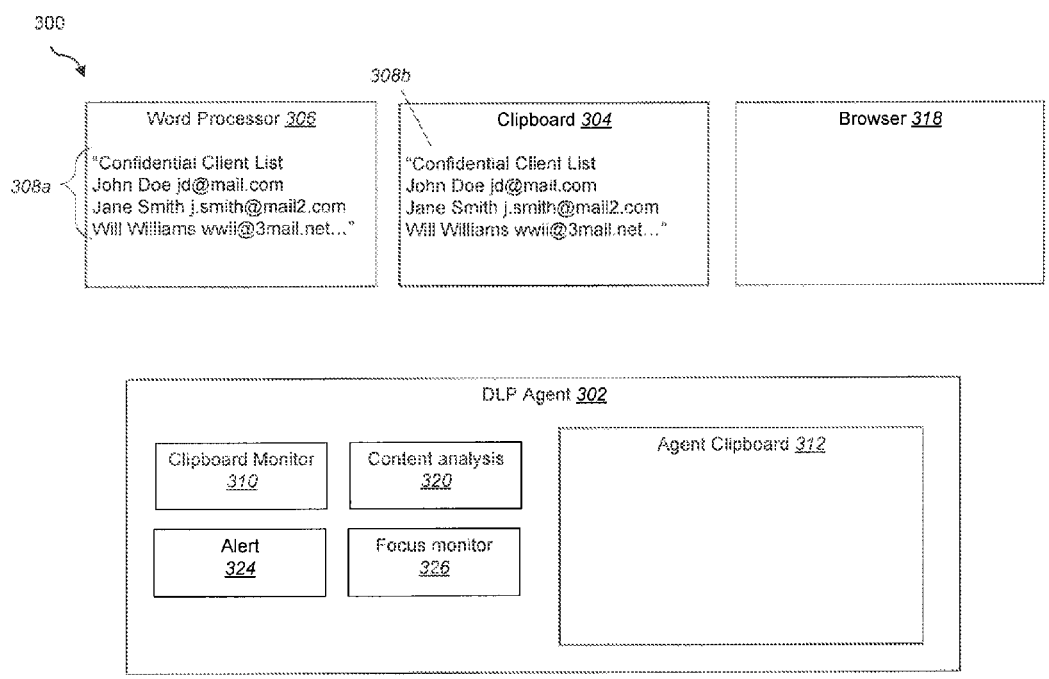
FIGS. 3A-C show a block diagram illustrating a client system including a DLP agent for clipboard monitoring in accordance with an embodiment of the present disclosure.

FIG. 3A shows an example of a client system 300 which includes a DLP agent 302 configured to monitor the system clipboard 304 and prevent sensitive information from being copied between applications. As shown in FIG. 3A, a word processor application 306 includes text 308a. The user initiates a copy command within the word processor application 306 targeting the text 308a. This sends a copy of the text 308b to the clipboard.

A clipboard monitor module 310 of the DLP agent 302 monitors the system for content being copied to the clipboard 304. In response to identifying content being copied to the clipboard 304, the DLP agent creates a delayed clipboard object 314 referencing the DLP agent 302, as shown in FIG. 3B.

A delayed clipboard object provides a reference in place of text which directs the system managing the clipboard to, upon receiving a "paste" command, request text from the referenced application. The delayed clipboard object typically reduces unnecessary copying by not requiring the text to be copied until it is required for pasting. As described herein, the delayed clipboard object provides an opportunity for the DLP agent to intercept copied text and prevent inappropriate transfer of sensitive data between applications.

Figure 3B:
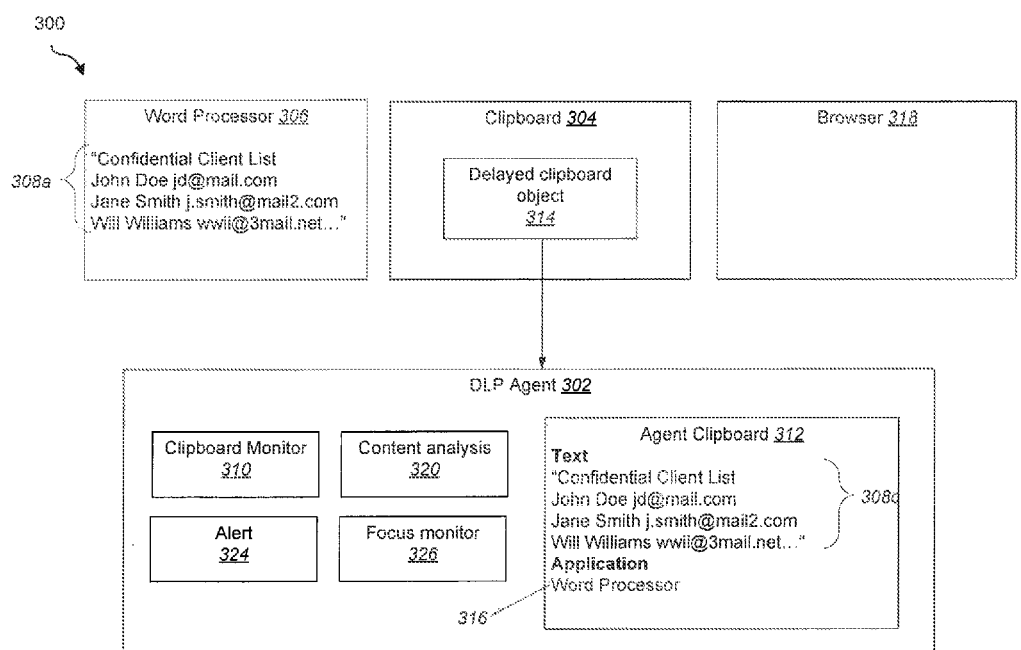

As illustrated in FIG. 3B, the DLP agent 302 copies the text 308c to an agent clipboard module 312. In some implementations, the agent 302 may also record the identity of the application that originally initiated the "copy" command to the clipboard 304—shown in entry 316 as "word processor" in the example illustrated in FIG. 3B.

Upon a user attempting to use a "paste" command to copy the text to a browser window 318, the DLP agent 302 submits the copied text 308c to a content analysis module 320. In some implementations, the format of the text may be used to identify it as sensitive data (such as personnel or medical records). In some information, particular content (such as a list of key words associated with non-public projects) may be used to identify sensitive data. Any method for analyzing a file to determine the presence or absence of sensitive data may be used by the content analysis module 320 as appropriate to the clipboard text 308c.

If the content analysis module 320 concludes that the data is non-sensitive, then the clipboard "paste" command is allowed to proceed as normal. The text 308c is copied back to the clipboard 304 and into the application associated with the "paste" command.

Figure 3C:
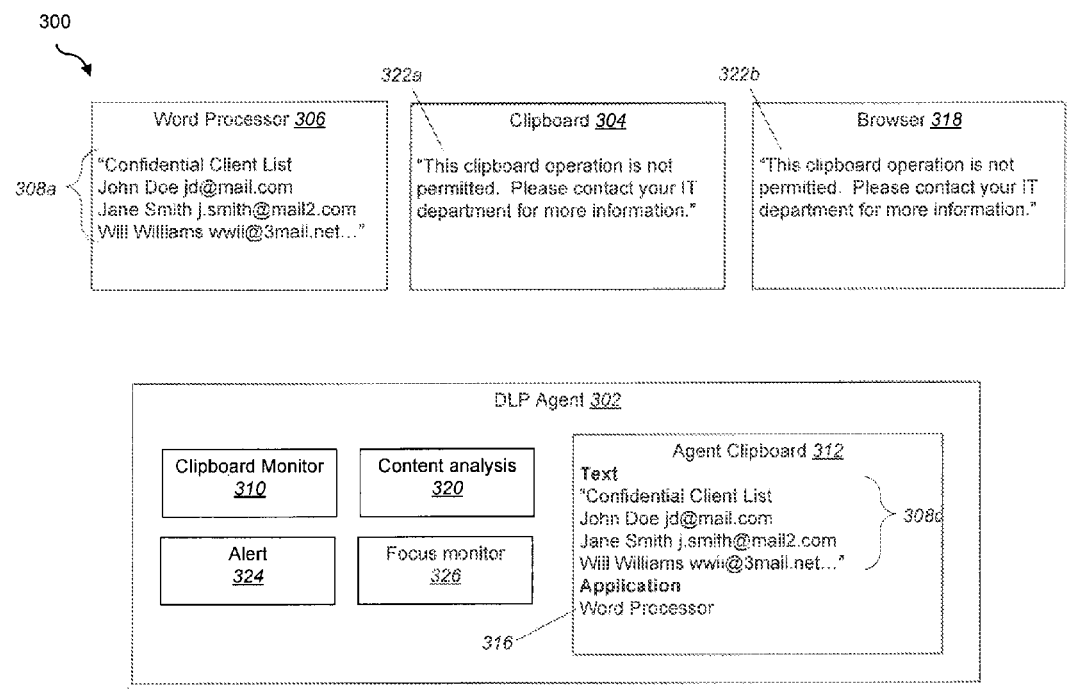

However, as shown in FIG. 3C, if the content analysis module 320 concludes that the data is sensitive, then the DLP agent 302 may not supply the copied text 308c to the clipboard. Rather than supplying the sensitive data, the DLP agent 302 may supply alternative text 322a to the clipboard 322a, which may then be copied as text 322b to the browser application 318. Rather than supplying alternate text, the DLP agent may supply no text.

In some implementations, the DLP agent may include an alert module 324 that generates an alert whenever sensitive information is intercepted. The alert module 324 may collect information regarding both the origin application of the text (as shown in the entry 316 of the agent clipboard module 312) and the destination application that the text would have been pasted to. The DLP agent 302 may record any of the collected information in an event log and may provide some or all of this information in an alert which is displayed to the user when the paste is prevented.

In some implementations, an exception for pasting sensitive material may be made if the destination application for the text is the same as the origin application for the text. Using the illustrated example of FIGS. 3A-3C, should the user attempt a "paste" command from the word processor application 306, the DLP agent 302 may supply the clipboard text 308c rather than an alternate text.

In some implementations, the DLP agent 302 may include a focus monitor 326 that tracks which application is the current foreground application for the system 300. One use of the focus monitor 326 is as a queue to re-capture text which may have been sent to the clipboard 304 after a "paste" command. Each time the focus monitor 326 detects a transition from one foreground application to another, the DLP agent 302 checks to see if there is text in the clipboard, and if so the DLP agent again copies the text to the agent clipboard 312 and replaces the clipboard text with a delayed clipboard object. This way, the DLP agent 302 can exercise further control on clipboard text rather than being limited to the first time that a particular text is copied to the clipboard.

Figure 4:
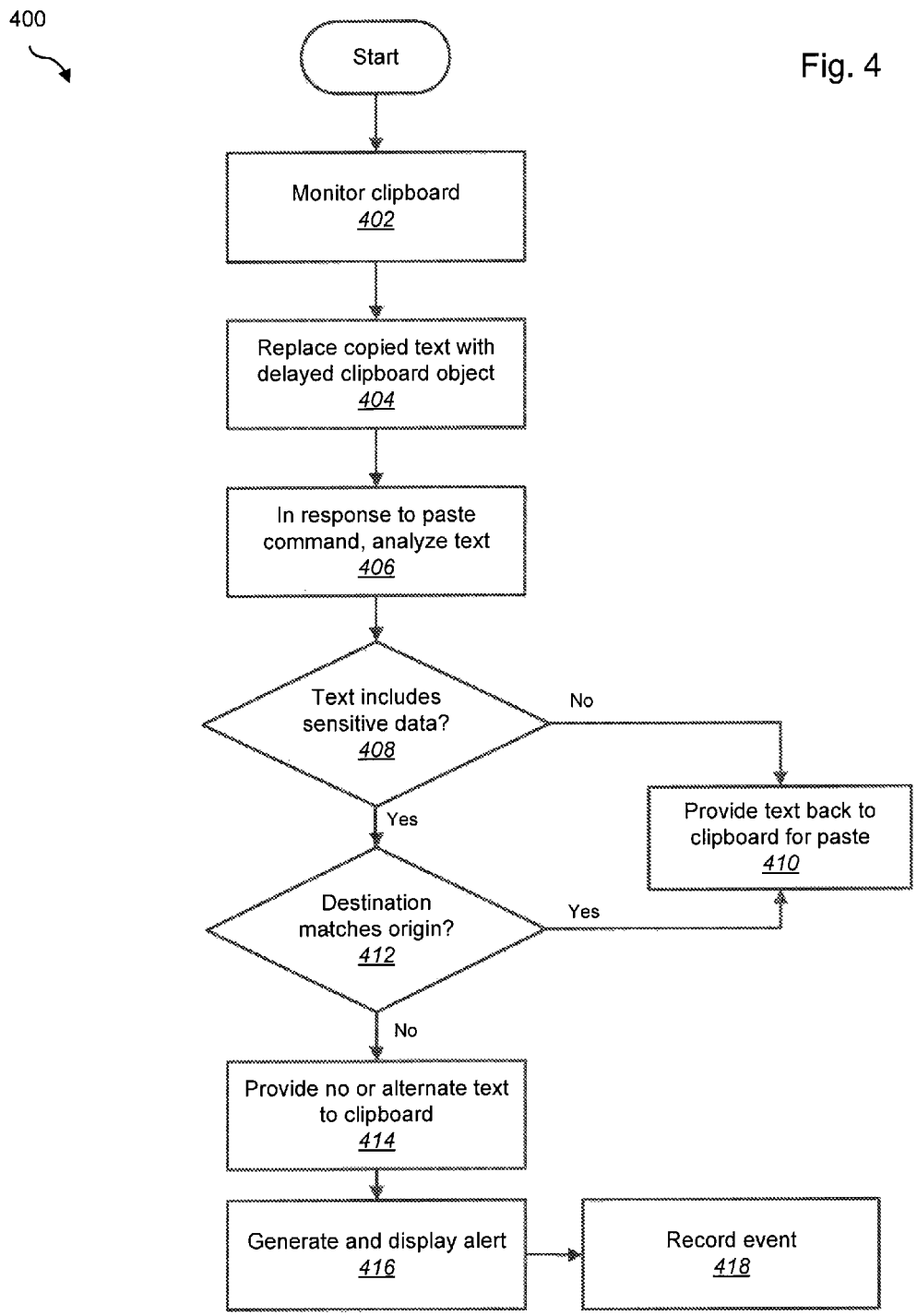
FIG. 4 shows a method for clipboard monitoring in accordance with an embodiment of the present disclosure.

FIG. 4 illustrates a method 400 for clipboard monitoring by a data loss prevention agent. The agent monitors the system for use of the system clipboard (302). In some implementations, the monitoring may occur through the use of any appropriate framework, such as a file system driver.

Upon identifying a "copy" command representing the copying of text to the clipboard, the DLP agent copies the text to its agent clipboard and replaces the clipboard text with a delayed clipboard object (404). The delayed clipboard object refers to the DLP agent so that the agent will have the opportunity to analyze and approve the text before it is pasted out of the clipboard.

When a "paste" command is received by the system and the delayed clipboard object calls the DLP agent, the agent analyzes the copied text for sensitive data (406). Sensitive data may be identified by any method known in the art, which may include identifying the formatting of any text included in the data and may also include matching the data against data known to be sensitive. The agent may also take other factors into account; for example, the identity of the user, the computer system, and even time and date information may potentially impact whether the particular clipboard text is considered to be too sensitive to be copied.

If the agent determines that the copied text does not include sensitive data ("no" from 408), then the text is copied back to the clipboard to be pasted (410). In some implementations, when the text is allowed to be pasted, there may be no indication to the user that any monitoring or interception occurred by the DLP agent. The user sees that the text is pasted to the destination as expected.

The agent may then check the identity of the origin application for the clipboard text as well as the intended destination. In some implementations, a copy and paste within a particular application may be permitted even if the data is considered sensitive. If the agent determines that the copied text includes sensitive data that should not be copied ("yes" from 408) but the destination and the origin application are the same ("yes" from 412), then the text may still be copied back to the clipboard to be pasted (410).

If the agent determines that the copied text includes sensitive data that should not be copied ("yes" from 408) and the destination and origin applications are not the same ("no" from 412), then the text may not be copied back from the agent clipboard object (414). Alternate text, or no text, may be provided to the clipboard for the paste event. In some implementations, the system may also generate and display an alert to one or more users indicating that the text paste was prevented (416) and may record the event in a log as described above (418).

At this point it should be noted that techniques for clipboard monitoring in accordance with the present disclosure as described above may involve the processing of input data and the generation of output data to some extent. This input data processing and output data generation may be implemented in hardware or software. For example, specific electronic components may be employed in DLP agents or similar or related circuitry for implementing the functions associated with clipboard monitoring in accordance with the present disclosure as described above. Alternatively, one or more processors operating in accordance with instructions may implement the functions associated with clipboard monitoring in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
   identifying text that has been copied from an origin application to a clipboard;
   copying the identified text to a cache separate from the clipboard;
   replacing the identified text in the clipboard with a delayed clipboard object, wherein the delayed clipboard object is stored in the clipboard in place of the identified text;
   in response to a reference call from the delayed clipboard object, analyzing the copied text for sensitive data, wherein the reference call is associated with a paste command; and
   in response to determining that the copied text includes sensitive data, providing a response to the reference call from the delayed clipboard object that does not include the copied text.

2. The method of claim 1, wherein the copied text is first copied text, the method further comprising:
   identifying second text that has been copied from an application to the clipboard; copying the identified second text to the cache separate from the clipboard;
   replacing the second identified text in the clipboard with a second delayed clipboard object;
   in response to a reference call from the second delayed clipboard object, analyzing the second copied text for sensitive data;
   identifying both the origin application from which the second text was copied and a destination application associated with the reference call; and
   in response to determining that the origin application matches the destination application, providing a response to the reference call from the delayed clipboard object that includes the copied text.

3. The method of claim 1, further comprising:
   monitoring a foreground application associated with the clipboard;
   in response to determining that the foreground application has switched from a first application to a second application, determining if there is text in the clipboard;

in response to determining that there is the text in the clipboard, replacing the text with a delayed clipboard object.

4. The method of claim 1, further comprising:
providing alternative text to the clipboard such that the alternative text will be provided to a destination application upon resolution of the paste command associated with the reference call.

5. The method of claim 1, further comprising:
displaying an alert notifying a user that the paste command has been blocked.

6. The method of claim 1, further comprising:
collecting data including at least the copied text, the origin application from which the text was copied to the clipboard, and a destination application associated with the reference call; and
recording the collected data in an event log.

7. An article of manufacture comprising:
at least one processor readable storage medium; and instructions stored on the at least one medium;
wherein the instructions are configured to be readable from the at least one medium by at least one processor and thereby cause the at least one processor to operate so as to:
identify text that has been copied from an origin application to a clipboard;
copy the identified text to a cache separate from the clipboard;
replace the identified text in the clipboard with a delayed clipboard object, wherein the delayed clipboard object is stored in the clipboard in place of the identified text;
in response to a reference call from the delayed clipboard object, analyze the copied text for sensitive data, wherein the reference call is associated with a paste command; and
in response to determining that the copied text includes sensitive data, provide a response to the reference call from the delayed clipboard object that does not include the copied text.

8. The article of claim 7, wherein the copied text is first copied text, the at least one processor further operable to:
identify second text that has been copied from an application to the clipboard; copy the identified second text to the cache separate from the clipboard;
replace the second identified text in the clipboard with a second delayed clipboard object; in response to a reference call from the second delayed clipboard object, analyze the second copied text for sensitive data;
identify both the origin application from which the second text was copied and a destination application associated with the reference call; and
in response to determining that the origin application matches the destination application, provide a response to the reference call from the delayed clipboard object that includes the copied text.

9. The article of claim 7, the at least one processor further operable to:
monitor a foreground application associated with the clipboard;
in response to determining that the foreground application has switched from a first application to a second application, determine if there is text in the clipboard;
in response to determining that there is the text in the clipboard, replace the text with a delayed clipboard object.

10. The article of claim 7, the at least one processor further operable to:
provide alternative text to the clipboard such that the alternative text will be provided to a destination application upon resolution of the paste command associated with the reference call.

11. The article of claim 7, the at least one processor further operable to: display an alert notifying a user that the paste command has been blocked.

12. The article of claim 7, the at least one processor further operable to:
collect data including at least the copied text, the origin application from which the text was copied to the clipboard, and a destination application associated with the reference call; and
record the collected data in an event log.

13. A system comprising:
one or more processors communicatively coupled to a network; wherein the one or more processors are configured to:
identify text that has been copied from an origin application to a clipboard;
copy the identified text to a cache separate from the clipboard;
replace the identified text in the clipboard with a delayed clipboard object, wherein the delayed clipboard object is stored in the clipboard in place of the identified text;
in response to a reference call from the delayed clipboard object, analyze the copied text for sensitive data, wherein the reference call is associated with a paste command; and
in response to determining that the copied text includes sensitive data, provide a response to the reference call from the delayed clipboard object that does not include the copied text.

14. The system of claim 13, wherein the copied text is first copied text, the one or more processors further configured to:
identify second text that has been copied from an application to the clipboard; copy the identified second text to the cache separate from the clipboard;
replace the second identified text in the clipboard with a second delayed clipboard object;
in response to a reference call from the second delayed clipboard object, analyze the second copied text for sensitive data;
identify both the origin application from which the second text was copied and a destination application associated with the reference call; and
in response to determining that the origin application matches the destination application, provide a response to the reference call from the delayed clipboard object that includes the copied text.

15. The system of claim 13, the one or more processors further configured to:
monitor a foreground application associated with the clipboard;
in response to determining that the foreground application has switched from a first application to a second application, determine if there is text in the clipboard;
in response to determining that there is the text in the clipboard, replace the text with a delayed clipboard object.

16. The system of claim 13, the one or more processors further configured to:

provide alternative text to the clipboard such that the alternative text will be provided to a destination application upon resolution of the paste command associated with the reference call.

17. The system of claim 13, the one or more processors further configured to: display an alert notifying a user that the paste command has been blocked.

18. The system of claim 13, the one or more processors further configured to:
- collect data including at least the copied text, the origin application from which the text was copied to the clipboard, and a destination application associated with the reference call; and
- record the collected data in an event log.

\* \* \* \* \*